June 6, 1944.  J. E. GRIFFITH  2,350,608
COMBINED LAND, AIR, AND WATER VEHICLE
Filed March 19, 1942  3 Sheets-Sheet 1
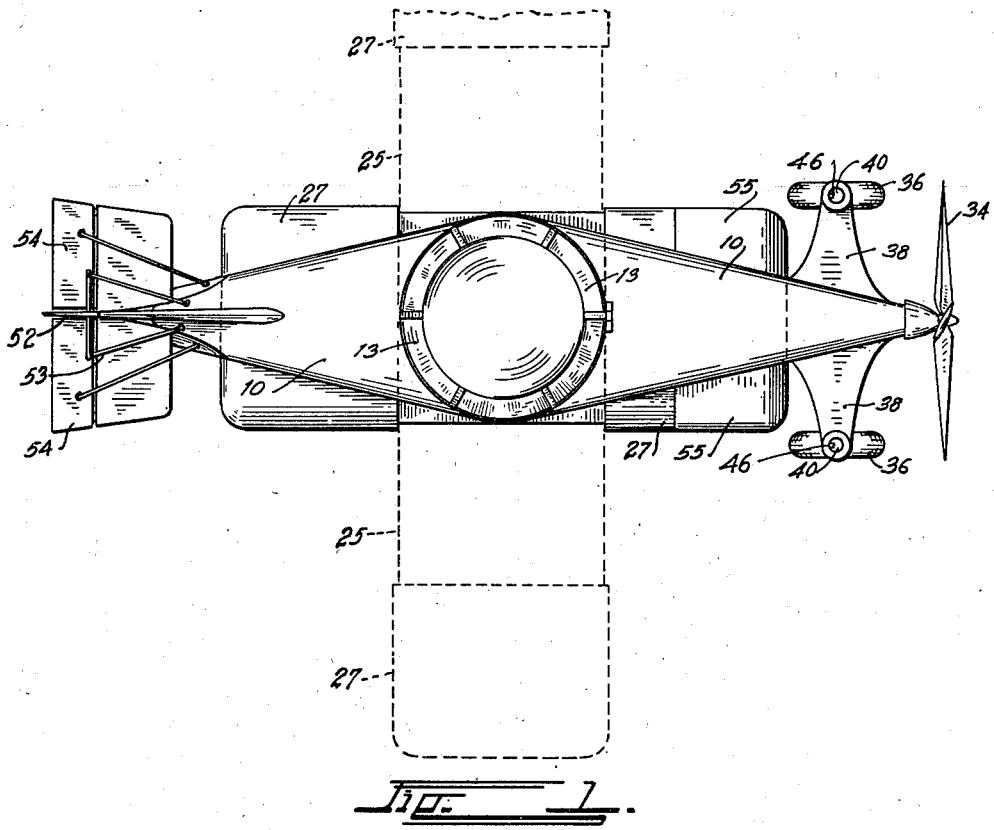
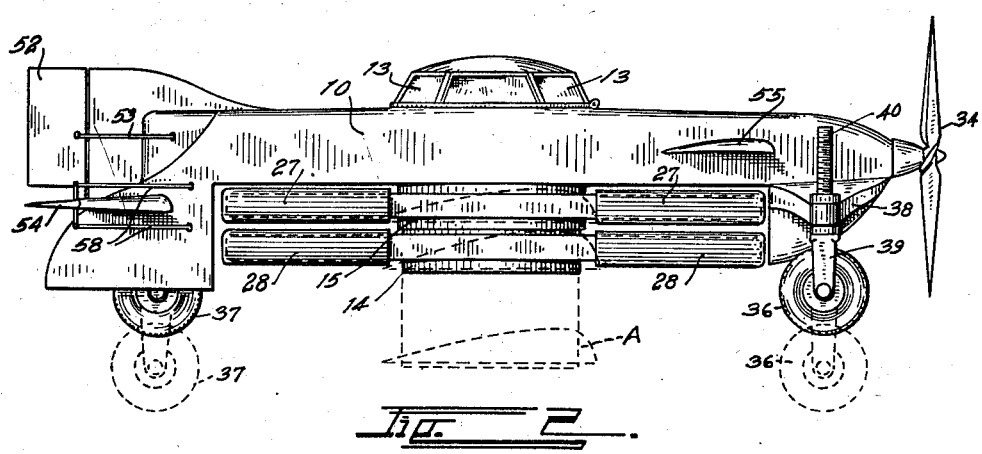
INVENTOR.
JAMES E. GRIFFITH.
BY
ATTORNEY.

June 6, 1944. J. E. GRIFFITH 2,350,608
COMBINED LAND, AIR, AND WATER VEHICLE
Filed March 19, 1942 3 Sheets-Sheet 2
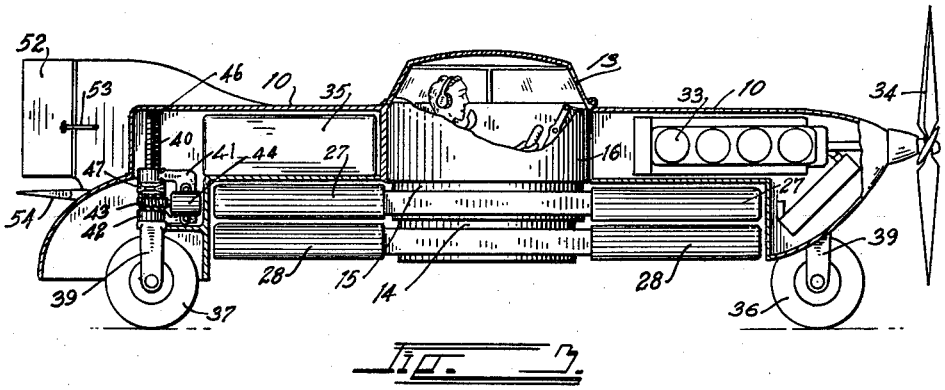
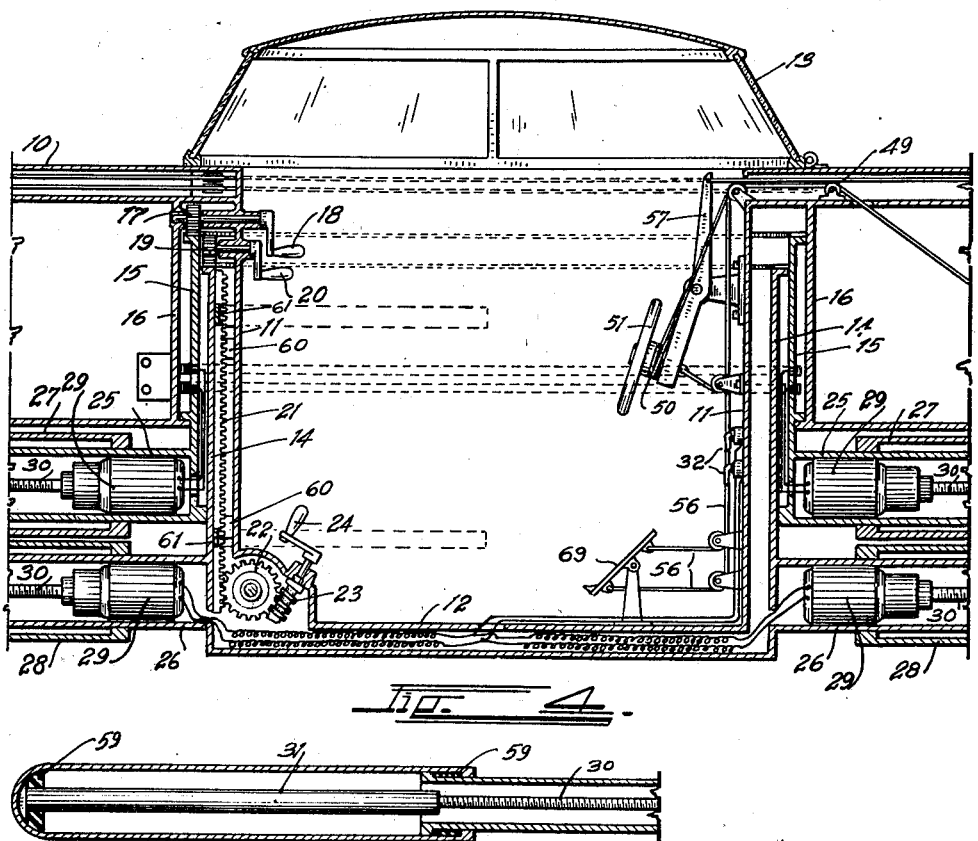
INVENTOR.
JAMES E. GRIFFITH.
BY
ATTORNEY.

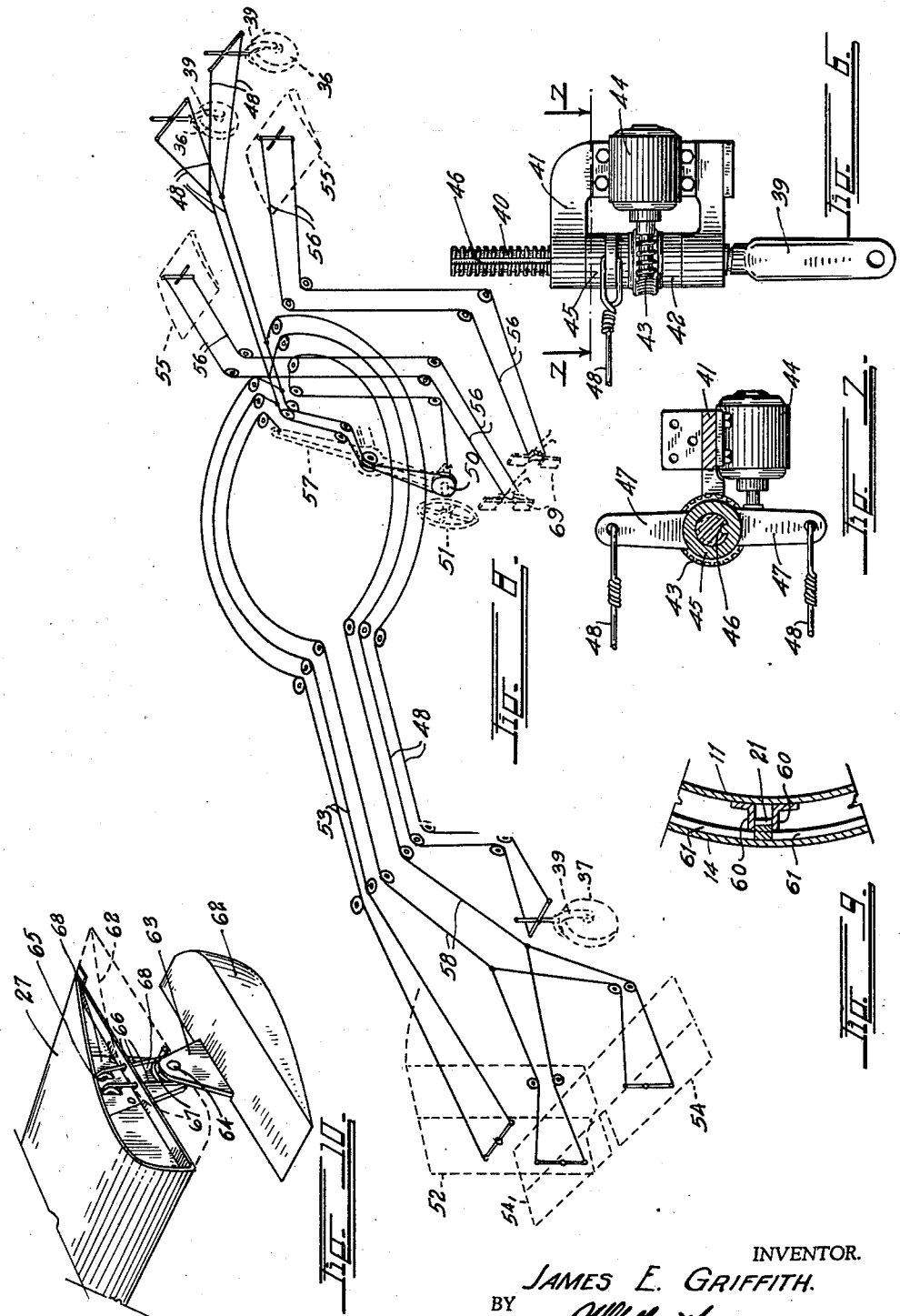

Patented June 6, 1944

2,350,608

UNITED STATES PATENT OFFICE 2,350,608

COMBINED LAND, AIR, AND WATER VEHICLE

James E. Griffith, Denver, Colo.

Application March 19, 1942, Serial No. 435,434

5 Claims. (Cl. 244—49)

This invention relates to a combined land, water, and air craft, and has for its principal object the provision of a structure which can be quickly and easily adapted for travel in any of the three mediums by manipulation of simple controls in the pilot's cabin.

Other objects of the invention are to provide a folding structure for a craft of this type which will occupy but a minimum of space when being used on land; to provide an adjustable wing structure which will enable the craft to fly either as a monoplane or biplane; and to provide means whereby, if the wings are damaged while flying as a monoplane, they can be quickly and easily replaced by a second set of wings while in the air.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the improved craft illustrating, in broken line, the extended position of the wings;

Fig. 2 is a side view thereof as it would appear as a land craft;

Fig. 3 is a longitudinal section therethrough;

Fig. 4 is an enlarged longitudinal section through the control cabin;

Fig. 5 is a detail, longitudinal section through a wing tip;

Fig. 6 is a detail side view of a wheel supporting mechanism as used in the improved plane;

Fig. 7 is a longitudinal section through the wheel support, taken on the line 7—7, Fig. 6;

Fig. 8 is a control diagram illustrating the action of the various control cables employed in the improved craft;

Fig. 9 is a detail horizontal section through the lower wing rack bar; and Fig. 10 is a detail, perspective view of a type of movable outrigger float which may be used on the wings if desired.

The craft is constructed in and about a rigid body of fuselage 10 the bottom of which is recessed upwardly to receive the wings of the craft.

The cabin or cock-pit of the improved craft is positioned approximately at the middle of the fuselage and is enclosed by a cylindrical cabin wall 11, a bottom plate 12, and a windowed vision canopy 13. The cabin wall 11 is surrounded by an inner cylinder 14, an outer cylinder 15, and a stationary cylinder sleeve 16. The cabin wall 11 and the sleeve 16 are fixed portions of the fuselage 10. The outer cylinder 15 is rotatable within the sleeve 16 and the inner cylinder 14 is both rotatable and vertically movable within the cylinder 15.

Rotation and movement of the various cylinders may be accomplished in any desired manner. As illustrated, the upper annular edges of both cylinders are provided with rack teeth. The teeth of the outer cylinder mesh with a gear 17 rotated from an upper wing control handle 18. The teeth of the inner cylinder mesh with a second gear 19 which is rotatable from a lower wing control handle 20.

The inner cylinder is provided with a vertical toothed rack bar 21 with which a rack gear 22 meshes. The rack bar 21 is held constantly in vertical alignment with the cabin wall 11 by means of side guides 60 which prevent the rack bar from rotating with the inner cylinder 14 as shown in Fig. 9. The rack bar is keyed to the inner cylinder on circumferentially extending key bars 61 which pass through notches in the rack bar so that when the latter is moved upward or downward the inner cylinder 14 must move with it. The gear 22 is rotated from a worm 23 which in turn is rotated from a hand crank 24. While the gears 17, 19, and 22 have been illustrated as hand operated, they could, of course, be driven from suitable motors if preferred.

A pair of oppositely projecting upper, inner wing sections 25 are fixed to the outer cylinder 15 and a pair of oppositely projecting lower, inner wing sections 26 are fixed to the inner cylinder 14. The wing sections 25 and 26 form the inner portions of two sets of wings. An outer wing section 27 is telescopically fitted over each of the upper wing sections 25 and an outer wing section 28 is telescopically fitted over the outer extremity of each of the lower wing sections 26.

The outer wing sections may be extended or withdrawn by any desired mechanism such as by hand mechanism, pneumatic devices, or electric motors. As illustrated, they are operated from suitable electric motors 29, one of which is mounted in each of the inner wing sections. Each of these motors drives a threaded shaft 30, the outer extremity of which is received in an internally threaded, elongated nut 31. The nut 31 is connected at its outer extremity with the respective outer wing section. It can be readily seen that as the motors rotate in one direction, the outer wing sections will be drawn inwardly and when rotated in the other direction the outer wing sections will be forced outwardly toward the extended position. Current to the motors is controlled by means of suitable switches 32 within reach of the pilot.

The space in the fuselage forward of the pilot's cabin contains a suitable propelling motor 33 for driving a tractor propeller 34. The remaining space forward and aft of the pilot's cabin is used for fuel storage tanks 35 and other equipment.

When on land, the craft is supported on two forward wheels 36 and a single rearward wheel 37. The forward wheels 36 are supported from bracket arms 38 projecting outwardly at each side of the nose of the fuselage. The rear wheel 37 is mounted on the center line of the craft at the rear thereof. All wheels are mounted in steerable, extensible supports.

Such a support is illustrated more in detail in Figs. 6 and 7 and comprises a wheel fork 39 for receiving the wheel. The fork is formed with a threaded pivot shank 40 which passes freely through a guide yoke 41. A rotatable nut member 42 is threaded onto the shank 40 within the yoke 41. The nut member is rotated by means of a worm gear 43 driven from a suitable electric motor 44. A tiller block 45 surrounds the shank 40 within the yoke 41. The shank 40 is axially movable through the tiller block but the latter is splined thereto in a longitudinal spline slot 46 so that the shank and tiller block rotate as a unit. The tiller block is provided with oppositely projecting tiller arms 47 from which steering cables 48 extend.

The steering cables 48 lead to the pilot's cabin over suitable pulleys 49. At the pilot's cabin the cables are trained around a hub 50 on a steering wheel 51. For steering purposes, when the craft is in the air, a vertical rudder 52 is provided. This rudder is connected through the medium of rudder cables 53 with the steering cables 48 so that the rudder moves in unison with the wheels.

The horizontal air flight is controlled by means of two tail elevators 54 and two ailerons 55 positioned forwardly and at each side of the fuselage 10. Control cables 56 extend from the ailerons 55 to suitable controls 69 in the pilot's cabin. Control cables 58 extend from the tail elevators 54 to the pilot's cabin where they terminate in a rocking support 57 supporting the steering wheel 51.

In Figs. 1, 2, and 3, the arrangement for land use with the wheels in contact with the ground surface is illustrated. When so arranged, the wings are collapsed and turned to a position parallel with the axis of the fuselage and are drawn upwardly therein.

If it is desired to take off for flight, the outer cylinder 15 is rotated by means of the upper wing control handle 18 so that it extends transversely of the fuselage. The extension motors 29 are then operated to project the wing tips to increase the wing length to the full size, as shown in broken line in Fig. 1. The craft can then fly as a monoplane. If it is desired to use both wings, the lower wing control handle 20 is operated to rotate the inner cylinder 14 to bring the lower wings to a transverse position. The crank 24 is then operated to lower the inner cylinder to its fully depressed position and the motors 29 are started to extend the lower wing to its fully extended position. The wing then occupies the position indicated in broken line at "A," Fig. 2.

If it is desired to lower the lower wing while on the ground, it is necessary to operate the wheel motors 44 to elevate the fuselage sufficiently far above the ground to provide clearance for the lower wing. The craft is then flown as a regular biplane controlled by the ailerons 55, the elevators 54, and the rudder 52, the wheels, of course, being drawn inwardly during flight to reduce head resistance.

Should it be desired to alight on water, the lower wing is turned to a position parallel to the axis of the fuselage while retaining its lower position. This wing then serves as a boat or pontoon to support the craft on the water surface while the upper wing serves to lift the craft from the water. Suitable gaskets 59 seal the telescoping wings to prevent the entrance of water. The craft can be lowered on the water by simply operating the crank 24 to lower the fuselage on the lower wing structure.

In Fig. 10 an arrangement is illustrated for providing outriggers or wing pontoons which may be used to prevent tipping when on rough water if desired. This is accomplished by placing wing tip pontoons 62 on the two extreme extremities of the upper wing. These pontoons are mounted on arms 63 which extend downwardly to a pivot 64 on bracket members 65 which in turn extend downward from the tips of the outer sections of the upper wing. By rotating the arms 63 about their pivots the pontoons can be swung downward to a position below the tips of the upper wings where they will engage the water surface to prevent tilting or tipping to either side while the craft is resting on the boat or pontoon formed by the lower wing. The arms 63 may be swung upwardly or downwardly in any desired manner such as by flexible cables 66 extending around a drum 67 on the arms to a position within reach of the pilot. Stop members 68 are provided to limit the extreme movements of the moveable wing tips.

It is desired to call attention to the safety of the pilot in the improved craft, both from war and "crack-up" hazards. The pilot is surrounded by four walls which due to their cylindrical shape are extremely crush resistant and bullet resistant.

The propeller 34 may be used to impart forward movement to the craft on land or water or when in the air. If desired, for land use the motive power may be transmitted directly to the wheels and the propeller disconnected.

While the inner and outer cylinders 14 and 15 have been described as continuous imperforate members, it can be readily seen that the craft may be materially lightened by cutting away portions of the cylindrical walls thereof.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An aeroplane comprising: an elongated fuselage; a rotatable member projecting downwardly from the middle of said fuselage; wings projecting oppositely outward from said rotatable member; a second coaxial rotating member at the middle of said plane; a second set of wings projecting oppositely outward from said second rotatable member; and means for moving said second rotatable member downwardly to separate the two sets of wings.

2. An aeroplane comprising: a fuselage; a rotatable cylinder projecting downwardly from said fuselage; wings projecting radially opposite from said cylinder; a second cylinder within the first cylinder mounted for both circumferential and axial movement therein; and a second set of wings projecting oppositely outward from said inner cylinder.

3. An aeroplane comprising: a fuselage; a rotatable cylinder projecting downwardly from said fuselage; wings projecting radially opposite from said cylinder; a second cylinder within the first cylinder mounted for both circumferential and axial movement therein; a second set of wings projecting oppositely outward from said inner cylinder; and means for rotating either cylinder independently of the other.

4. An aeroplane comprising: a fuselage; a rotatable cylinder projecting downwardly from said fuselage; wings projecting radially opposite from said cylinder; a second cylinder within the first cylinder mounted for both circumferential and axial movement therein; a second set of wings projecting oppositely outward from said inner cylinder; means for rotating either cylinder independently of the other; and means for raising and lowering the inner cylinder in said outer cylinder.

5. An aeroplane comprising: a fuselage; a rotatable cylinder projecting downwardly from said fuselage; wings projecting radially opposite from said cylinder; a second cylinder within the first cylinder mounted for both circumferential and axial movement therein; a second set of wings projecting oppositely outward from said inner cylinder; means for rotating either cylinder independently of the other; and means for raising and lowering the inner cylinder in said outer cylinder, said cylinders being sufficiently large to allow the pilot's station to be positioned within the cylinders.

JAMES E. GRIFFITH.